United States Patent
Czech et al.

(10) Patent No.: US 6,515,094 B2
(45) Date of Patent: Feb. 4, 2003

(54) SILICONE AMINO-EPOXY CROSS-LINKING SYSTEM

(75) Inventors: Anna M. Czech, Cortlandt Manor, NY (US); Charles E. Creamer, Ridgefield, CT (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 09/796,313

(22) Filed: Feb. 28, 2001

(65) Prior Publication Data

US 2002/0010270 A1 Jan. 24, 2002

Related U.S. Application Data

(60) Provisional application No. 60/189,790, filed on Mar. 16, 2000.

(51) Int. Cl.$^7$ .............................................. C08G 77/08
(52) U.S. Cl. .............................. 528/12; 528/34; 528/38
(58) Field of Search ............................ 528/26, 38, 12, 528/34

(56) References Cited

U.S. PATENT DOCUMENTS

| | | | |
|---|---|---|---|
| 3,033,815 A | 5/1962 | Pike et al. | |
| 3,146,250 A | 8/1964 | Speier | |
| 3,761,444 A | 9/1973 | Mendicino | |
| 3,837,876 A | 9/1974 | Mayuzumi et al. | |
| 3,961,977 A | 6/1976 | Koda et al. | |
| 4,177,176 A | 12/1979 | Burrill et al. | |
| 4,247,592 A | 1/1981 | Kalinowski | |
| 4,378,250 A | 3/1983 | Treadway et al. | |
| 4,542,174 A | 9/1985 | Godlewski | |
| 4,584,342 A * | 4/1986 | Kondow | 524/860 |
| 4,970,252 A | 11/1990 | Sakuta et al. | |
| 5,063,260 A * | 11/1991 | Chen et al. | 523/213 |
| 5,314,980 A | 5/1994 | Morrison | |
| 5,703,178 A | 12/1997 | Gasmena | |

FOREIGN PATENT DOCUMENTS

| | | |
|---|---|---|
| EP | 469316 A2 | 6/1992 |
| EP | 515044 A1 | 11/1992 |
| GB | 1213779 | 11/1970 |

OTHER PUBLICATIONS

"The Siloxane Bond, Physical Properties and Chemical Transformations", Studies in Soviet Science, pp. 110 to 115. 1978.*

Derwent Abstract of EP 0 469 316.

* cited by examiner

Primary Examiner—Margaret G. Moore
(74) Attorney, Agent, or Firm—Michael P. Dilworth

(57) ABSTRACT

Reactive compositions comprise an amino-modified organopolysiloxane and an epoxy-modified organopolysiloxane. The composition cures slowly at room temperature or may be rapidly cured at or above room temperature in the presence of a carboxylic acid. The cured compositions may be utilized as elastomers, sealants, electronic potting materials, encapsulants, conformal coatings, foams, shock adsorbing gels, and molds and exhibit adhesion to metals, plastics, synthetic fibers, wood, paper, and glass.

14 Claims, No Drawings

SILICONE AMINO-EPOXY CROSS-LINKING SYSTEM

This application chams the benefit of Provisional application Ser. No. 60/189,790 filed Mar. 16, 2000.

BACKGROUND OF THE INVENTION

The invention relates to crosslinked organosilicone systems formed by the reaction of amino-substituted polysiloxanes with epoxy-substituted-polysiloxanes that exhibit excellent adhesion to a variety of substrates. Subject matter cross-linked silicone systems are useful as elastomers, sealants, electronic potting compounds, encapsulants, conformal coatings, foams, shock adsorbing gels, and molds.

PRIOR ART

It is well known in the art that organosilicone polymers, such as dimethylpolysiloxane, phenyl- and trifluoropropyl-substituted dimethylpolysiloxane copolymers, and the like, can be cross-linked to produce elastomers, adhesives, sealants, foams and gels via a number of methods. Perhaps the oldest method of achieving cross-linking of silicone polymers is the use of a peroxide, such as 2,4-dichlorobenzoyl peroxide, and heat to produce the cross-linked mass. Another method is the use of vinyl-substituted organopolysiloxane and peroxide, such a ditertiary-butyl peroxide to form a more uniform and reproducible cross-linked mass. Crosslinked organosilicone polymers can also be prepared by the platinum catalyzed hydrosilation reaction between silanic hydrogen fluids and polysiloxanes modified with the unsaturated groups. Examples of such systems are given in U.S. Pat. No. 4,970,252.

Another widely used method of cross-linking organosilicone copolymers is the condensation of hydroxy-terminated silicone polymers with multi-functional alkoxy silanes using metal soaps, such as dibutyltindilaurate, or stannous octoate.

Yet another method of cross-linking organosilicone polymers is by reacting hydroxy-functionalized fluids with silanic hydrogen fluids in the presence of a base, such as described in U.S. Pat. No. 4,177,176.

Examples of the reactive systems utilizing the reaction of an amine with an epoxy group can be found in the prior art. Most of this prior art, however, relate to amino- or epoxy-functionalized, trialkoxy silanes, or their hydrolyzates cured by themselves or with the organic resins.

U.S. Pat. No. 4,542,174 teaches combination of oxirane compounds and acylamino- or cyano-silane which are stable at room temperature and can be utilized as one-component additives for inorganic fillers employed in filled condensation polymer systems.

U.S. Pat. No. 5,314,980 discloses a coating composition comprising and epoxy component selected from the group consisting of epoxy silane, or epoxy silane hydrolysis/condensation products, an amine hardener selected from organic amines, aminosilane and hydrolyzed aminosilane and a metal component-containing stabilizer to delay crosslinking for more than 3 days. U.S. Pat. No. 4,378,250 teaches coating compositions comprising an organic solvent and a mixture of at least two components derived by partial hydrolysis of precursor epoxy- and amino-functionalized alkoxy silanes. Similar reactive coating compositions are disclosed in U.S. Pat. No. 3,961,977.

U.S. Pat. No. 3,837,876 relates to organosilicone compositions, comprising an organic solvent, a certain aminoalkylalkoxysilane and a certain epoxyalkoxysilane, useful in the improvement of adhesion of sealants and primers.

U.S. Pat. No. 5,703,178 describes heat ablative coating compositions prepared by combining an epoxysilane, an epoxy resin, a silicone intermediate, a silicon-modified polyether, an aminosilane, an organometallic catalyst and other components.

Existing silicone crosslinking technologies, although useful, present several disadvantages in the applications:

Platinum catalyzed addition cure systems are prone to catalyst poisoning, and, without the use of an adhesion promoter that must be applied separately, exhibit poor adhesion to metal, plastic, and glass substrates. These systems are also prone to produce by-product hydrogen gas during the cross-linking reaction; a phenomena that can result in the unintentional entrapment of gas bubbles within the cross-linked mass.

Condensation cure silicone systems produce by-products, such a methyl alcohol and ethyl alcohol, and once mixed, have short working life. Since water is essential to achieve cross-linking in these types of systems, other additives are typically required to achieve depth of cure. In addition, condensation cure silicone systems adhere poorly to substrates without use of an adhesion promoter or primer, and accordingly, their uses are limited to applications where these limitations are not restrictive.

Peroxide cross-linked systems require elevated temperatures to initiate cross-linking, and result in the formation of by-product acid or alcohol products. Post curing is generally required to remove these by-products from the cross-linked mass after initial cure. As with hydrosilation cure and condensation cure systems, an adhesion promoter or primer is generally required to obtain adhesion to metal, plastic, or glass substrates.

SUMMARY OF THE INVENTION

This invention relates to (1) novel reactive compositions comprising an amino-modified organopolysiloxane and an epoxy-modified organopolysiloxane and (2) a method for rapidly curing this composition into elastomers, sealants, electronic potting materials, encapsulants, conformal coatings, foams, shock adsorbing gels, and molds, wherein no by-product is produced during the curing process and the cross-linked material exhibits adhesion to metals, plastics, synthetic fibers, wood, paper, and glass.

The reactive compositions of present invention comprise:

a. an amino-modified organopolysiloxane of the average general formula:

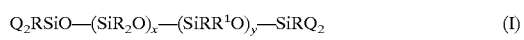

$$Q_2RSiO-(SiR_2O)_x-(SiRR^1O)_y-SiRQ_2 \quad (I)$$

wherein Q is R or $R^1$; R is selected from the group consisting of monovalent hydrocarbon groups having 1 to 10 carbon atoms; $R^1$ is $R^2NHR^3$; each $R^2$ is the same or different and is a divalent $C_1$–$C_6$ alkylene group, optionally substituted with a hydroxyl group; $R^3$ is alkyl of $C_1$–$C_6$, an alkyl amine of $C_1$–$C_6$ (i.e. a $C_1$–$C_6$ alkyl group substituted with —$NH_2$) or an alkanolamine of $C_1$–$C_6$ (i.e. a $C_1$–$C_6$ alkyl group substituted with —OH and with —$NH_2$); x is zero or a positive number; y is a positive number and x+y are less than 1,100; and b. an epoxy-modified organopolysiloxane of the average general formula:

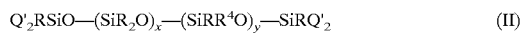

$$Q'_2RSiO-(SiR_2O)_x-(SiRR^4O)_y-SiRQ'_2 \quad (II)$$

wherein Q' is R or $R^4$; R is as previously defined; $R^4$ is $R^5$—$R^6$; $R^5$ is a divalent hydrocarbon group with at least two carbons, which may be may be interrupted by an oxygen atom; $R^6$ is an epoxide-containing group.

DETAILED DESCRIPTION OF THE INVENTION

In formulas (I) and (II) above, the monovalent hydrocarbon groups R include alkyl, aryl and aralkyl groups, and may be the same or different from one another. Examples are methyl, ethyl, butyl, hexyl, phenyl, benzyl, and phenethyl. Of these, lower alkyl groups ($C_1$–$C_4$) are preferred. The most preferable R group is methyl in both formulas.

In formula (I) Q is preferably R, most preferably methyl. In formula (II), Q' is preferably $R^4$. In formula (I) $R^2$ is preferably ethylene or propylene. $R^3$ is most preferably, hydrogen, but other examples of $R^3$ include methyl, ethyl, propyl, aminoethyl, aminopropyl and propanolamino. Specific $R^1$ groups include propylamine, propanolamine, N-methyl-propylamine and N-propanolamino-aminopropyl.

In formula (II) the $R^5$ groups may be aliphatic, cycloaliphatic, aromatic or mixed aliphatic/aromatic groups, or (poly)ether groups, for instance ethylene, propylene, ethylenephenylene, propyleneoxyethylene, phenylethylene, ethylhexylene, and the like. Exemplary $R^6$ groups include glycidoxy, 3-methyl-4,5-cyclohexenyl oxide and 3,4-cyclohexenyl oxide. Exemplary $R^4$ groups include glycidoxypropyl, 2-(3,4-cyclohexene oxide)ethyl or 2-(3-methyl-4,5-cyclohexene oxide)ethyl.

Preferably x ranges from 20 to 1000 and y ranges from 1 to 50; more preferably x ranges from 50 to 800, most preferably 50 to 500, y ranges from 1 to 20 and x/y ranges from 30:1 to 200:1 in formula (I), and from 5:1 to 30:1 in formula (II).

The composition of the present invention may optionally contain one or more organomodified trialkoxy silanes which are reactive with the above mentioned components. Such silanes may be selected from the group epoxy- and amino-modified silanes of the general formula:

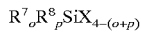

wherein $R^7$ is a monovalent hydrocarbon groups having 1 to 10 carbon atoms including alkyl, aryl and aralkyl groups. The $R^7$ groups may be the same or different from one another and are illustrated by methyl, ethyl, butyl, hexyl, phenyl, benzyl and phenethyl. Of these, lower alkyl groups ($C_1$–$C_4$) are preferred. Most preferably R is methyl. "o" can be zero or 1. $R^8$ is an amino or epoxy-functionalized group and may be as previously defined for $R^1$ or $R^4$ described above. "p" is an integer from 1 to 4. X is a hydrolyzable or condensable group bonded directly to Si, for instance OH, alkoxy, chloro, acyloxy, ketoximino, etc.

Amino-modified organopolysiloxanes used in the present invention are prepared, for example, by processes analogous to those disclosed in U.S. Pat. Nos. 3,033,815, 3,146,250 and 4,247,592 (which are incorporated by reference) by hydrolyzing the corresponding dialkoxy amino modified silane in excess water or water-solvent such as tetrahydrofuran mixture, at about 10 to about 50° C., preferably, room temperature, for about 2 to about 5 hours followed by vacuum stripping and equilibrating the resulting hydrolyzate with di(alkyl, aralkyl or aryl)-cyclo polysiloxane (source of $R_2SiO$ groups) and hexamethyldisiloxane, decamethyltetrasiloxane, or other reactants to serve as the source of the terminal $RQ_2SiO$ groups as defined by Formula (I) in the presence of a base catalyst, such as KOH, with heating at about 130 to about 150° C. for about 5 to about 12 hours.

Preparation of the epoxy-modified organopolysiloxanes of the present invention involves reacting methylhydrogen-containing organopolysiloxanes with the unsaturated epoxides with a terminal olefinic bond, in the presence of a hydrosilation catalyst, such as for example, hexachloroplatinic acid, at elevated temperature, to produce the epoxy organopolysiloxane. Such procedures are known in the art as indicated in U.S. Pat. No. 3,761,444 or British Patent No.1213779. Examples of suitable epoxides with terminal olefinic groups are given below:

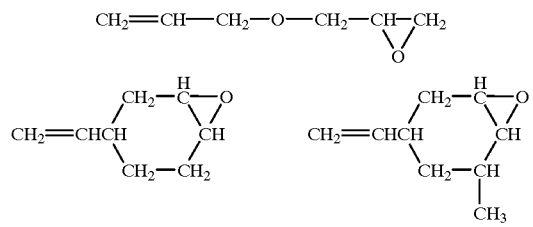

The compositions of the present invention may be prepared by manual or mechanical mixing (sigma mixer, Cowells mixer or roll mill) of the stoichiometric amounts of the components (a) and (b) or using up to two fold excess of the aminopolysiloxane. Stoichiometry of the system is calculated based on the amine content and the epoxy content, determined by titrations of the functional groups. Such titration methods are well known to those skilled in the art.

The compositions may further contain mineral fillers, such as, for example, aluminum oxide, clay, treated or untreated calcium carbonate and silica, and/or pigments such as titanium dioxide and iron oxide, and/or a plasticizer, such as dimethylpolysiloxane, for instance one having a viscosity of between 50–10,000 cSt, an organic ester or a hydrocarbon plasticizer. The level of the additives in the formulation may vary from about 1.0% to about 90% depending on the filler or the end use, most preferably between about 10% to about 80% of the weight of the total composition. The above mentioned fillers can be introduced into the composition of the present invention by manual mixing, with a spatula or paddle, or by mechanical mixing, with a dough mixer, sigma mixer, Cowells mixer or roll mill. The compositions of the present invention, whether filled or unfilled, can be stored at room temperature for several days but, if necessary, cured rapidly at room temperature or in an oven or on a heated surface or in a HAV (hot air vulcanization) chamber, in the presence of Bronsted or Lewis acids, such as acetic acid, chloroacetic acid, trichloroacetic acid, citric acid, glycolic acid, tetrabutyltitanate or dibutyltinlaurate. The curing time can be modified by changing the level of the acid in the composition, a typical concentration of the acid being from 0.0001% to 5%, preferably 0.001 to 2%.

The compositions of the present invention can be used in encapsulation, as an elastomer, shock adsorbing gel, adhesive, sealant, electrical potting compound, a conformal coating for electronic circuit boards, or as a coating for fibrous materials, such as woven and non-woven fabric. The composition of the present invention can be further used in combination with other silicone and non-silicone systems used in applications listed above. Specific uses include coatings for the fabric used in automotive air bags, a gel filling material for medical prosthesis, a conformal coating for electronic circuit boards, and a potting material for electronic devices.

The invention is illustrated by the following non-limiting examples.

EXAMPLES

Methods
  Adhesion—determined by ASTM Method D 3163-96
  Hardness—determined using Shore Durometer and reported as Shore A Hardness.

Example 1
Silicone Amino-Epoxy Compositions

Table 1 outlines compositions, curing times and hardness of the formed cured materials. The compositions were prepared by admixing the components with a laboratory mixer equipped with a ring propeller until uniform. Both, room temperature and oven curing experiments were carried out on 20 gram samples in the aluminum dishes.

TABLE 1

Compositions and Curing Results of the Amino-Epoxy Gels

|  | 1 | 2 | 3 | 4 |
|---|---|---|---|---|
| $MD_{260}D^*_6M$ | 60 g |  | 90 g | 60 g |
| $MD_{500}D^*_3M$ |  | 90 g |  |  |
| $M^*D_{43}D^{**}_{35}M^*$ | 20 | 10 | 20 g |  |
| $MD_{36}D^{**}_9M$ |  |  |  | 12 g |
| Viscosity of the Blend (cSt) | 660 | 2448 | 708 | 780 |
| Curing Time at RT | 6 days | >3 weeks | 13 days | 7 days |
| Curing Time at 125° C. | 60 min | 400 min | 200 min | 100 min |
| Gel Hardness (Shore A) | 13 | Very soft | 8 | 6 |

Where,
$M = (CH_3)_3SiO_{1/2}$
$D = (CH_3)_2SiO$
$D^* = OSi(CH_3)CH_2CH_2CH_2NHCH_2CH_2NH_2$
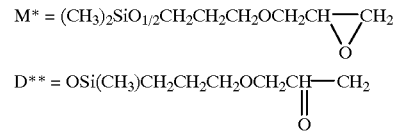

Both curing times and hardness of the gels can be modified by selecting appropriates components or changing the stoichiometry.

Example 2
Filled Silicone Amino-Epoxy Compositions

Silicone amino-epoxy compositions can be easily formulated into filled systems with different types of inorganic fillers such as alumina clay or silica, as listed in Table 2, by manual mixing of the components with a tongue depressor or a spatula.

Aluminum oxide and kaolin clay fillers were added as non-reinforcing fillers to increase the bulk density of the mixtures.

TABLE 2

Filled Compositions

|  | A | B | C | D |
|---|---|---|---|---|
| Levigated Alumina (Saint Gobain/Norton Industrial Ceramics Co. | 20 g | 20 g |  |  |
| Clay Satintone W (Engelhard) |  |  | 20 g |  |
| Silica Cabosil EH-5 (Cabot) |  |  |  | 2 g |
| Formulation 1 | 20 g |  | 20 g |  |
| Formulation 2 |  | 20 g |  |  |
| Formulation 3 |  |  |  | 20 g |
| Viscosity (cSt) | 2200 | 9800 | 25800 | 198000 |
| Curing Time at RT | 5 days | >3 weeks | 4 days | 12 days |
| Curing Time at 125° C. | 150 mm | 330 mm | 150 mm | 360 mm |
| Hardness (Shore A) | 10 | Soft | 16 | 13 |

Inorganic fillers increase the viscosity of the compositions, with the most dramatic increase caused by the use of high surface area silica or high surface area fumed aluminum oxide. The type of the filler, and its concentration also affects the hardness of the cured material.

Example 3
Cure of the Silicone Amino-Epoxy Systems

The time required to cross-link the amino-epoxy mixtures can be significantly reduced by the use of acids. Table 3 provides use levels of the selected acids and the curing times at both room and elevated temperature. The acids have been post added to the curing composition either neat or diluted and mixed in by hand.

TABLE 3

Curing of the Silicone Amino-Epoxy Systems

|  | I | II | III | IV | V | VI | VII |
|---|---|---|---|---|---|---|---|
| Formulation A | 10 g | 10 g | 10 g | 10 g | 10 g |  |  |
| Formulation D |  |  |  |  |  | 10 g |  |
| Formulation 1 |  |  |  |  |  |  | 10 g |
| 10% Acetic Acid in $D_5$ | 1.0 g | 0.2 g | 0.05 |  |  |  |  |
| 10% Chloroacetic Acid in PG |  |  |  | 0.2 g |  | 0.2 g | 0.2 g |
| 10% Citric Acid in IPA |  |  |  |  | 0.2 g |  |  |
| Curing Time at RT | <5 min. | 2 days | 2 days | 10 hours | 10 hours | 4.5 hours | 4.5 hours |
| Curing Time at 125° C. | — | 30 min | 60 min | 20 min | 25 min | 25 min | 20 min |

All acids decreased the curing time, α-chloroacetic acid and citric acid were more effective in catalyzing the cure.

Example 4
Adhesion of the Silicone Amino-Epoxy Cured Materials to Aluminum

Selected compositions were applied onto clean aluminum rectangles 25 mm×100 mm to afford an overlap area of approximately one square inch, and film thickness not higher than 0.25 mm. After curing, the specimens were tested using an Instron® stress/strain tester to determine the amount of force needed to break the adhered pieces. The tests were conducted using a crosshead speed of 0.05 inch/min. The results are summarized in Table 4.

TABLE 4

Lap Shear Test Results

| Formulation # | Overlap Area (inch²) | Load at Max Load (lbs.) | Failing Stress (lbs./inch²) | Comments |
|---|---|---|---|---|
| 1 | 0.97 | 48.6 | 50.1 | 100% Cohesive Failure |
| A | 1.44 | 85.66 | 59.3 | 95% Adhesive Failure |
| E | 1.16 | 178.1 | 153.4 | 85% Adhesive Failure |
| Control*⁾ | 1.00 | 5.94 | 5.94 | |

*⁾Control Mixture was formulated by mixing 20 g of the vinyl terminated dimethylpolysiloxane fluid having a viscosity 200 cSt (V-200 available from Crompton Corporation), and 5.2 g of methylhydrogen, dimethylpolysiloxane copolymer having a hydrogen content of 40 cc of hydrogen per gram (VXL cross-linker, available from Crompton Corporation), and catalyzing the mixture with one drop of the platinum catalyst (VCat-RT, available from Crompton Corporation).

Silicone amino-epoxy formulations show significantly improved adhesion to aluminum over the Control.

Example 5
Coating of Filled Silicone Amino-Epoxy Curing Systems onto Nylon Fabric 40 g of an amino-modified polysiloxane having a general formula:
$MD_{250}D^*_6M$, where $M=(CH_3)_3SiO_{1/2}$, $D=(CH_3)_2SiO$ and $D^*=OSi(CH_3)CH_2CH_2CH_2NHCH_2CH_2NH_2$, were mixed with 14.4 g of an epoxy-modified polysiloxane having a general formula $M^*D_{43}D^{**}_{3.5}M^*$, where
$M^*=(CH_3)_2SiO_{1/2}CH_2CH_2CH_2OCH_2CH\ CH_2$
and

5.44 grams of aluminum oxide C (available from Degussa Corporation) were added to this mixture and fully dispersed using a high-speed (500 RPM) impeller mixer. The mixture was sealed in a wide-mouth glass jar and stored at about 60° F. After four days of storage, no increase in viscosity was observed. A 10 gram sample of this material was weighed into an aluminum weighing dish, and placed in an oven at 115° C. After two hours, the product remained pourable and no sign of crosslinking was observed.

Example 6
Effect of the Acid 40 grams of the amino-modified dimethylpolysiloxane copolymer used in Example 5 were mixed with 14.4 grams of the same epoxy-modified fluid. 5 drops of glacial acetic acid were then added to the mixture. The mixture was completely clear; 5.44 grams of aluminum oxide C were then added to this mixture using the same high speed impeller mixer. After a uniform mixture was obtained, the material was placed into a 4 ounce wide-mouth glass bottle for storage.

10 grams of the mixture were weighed into an aluminum weighing dish and placed in an oven at 115° C. Within 15 minutes, the mixture cured to a tack free elastomeric material that completely adhered to the aluminum weighing dish.

5 grams of the mixture were applied to 100 square inches of fine weave nylon fabric. The mixture was uniformly worked into the fabric using the flat surface of a large spatula. After the material was coated, it was placed in the over at 115° C. for 10 minutes. On removal from the oven, the coating was found to be completely cured and free of tack. 2 grams of the mixture were spread on the surface of a blown polyester-urethane elastomeric film (U01 produced by Atochem). The coated film was placed in the oven at 125° C. for 5 minutes. Upon removal, the coating on the film was tack free, and well adhered to the film.

The remaining mixture that was stored in the glass jar remained fully pourable, when stored at 60° F. over a period of three days. On the fourth day, the material developed signs of cross-linking, but remained tacky. After six days at this storage temperature, the material was completely cross-linked to a non-tacky elastomer.

Example 7
Use of the Silicone Amino-Epoxy Curing System to Produce Gels 20 grams of the amino-modified dimethylpolysiloxane polymer described in Example 5 were mixed with 7.2 grams of the epoxy-modified dimethylpolysiloxane polymer described in the same example. 38 grams of 350 cSt dimethylpolysiloxane fluid having the formula.

$(CH_3)_3SiO[(CH_3)_2SiO]_xSi(CH_3)_3$ was added to the mixture. 10 drops of 5% acetic acid solution were added, and the mixture was heated at 115° C. for 30 minutes. The mixture cross-linked to form an extremely tacky gel that adhered strongly to the glass beaker in which it was heated.

Example 8
Use of the Silicone Amino-Epoxy Curing System to Form Two-part Elastomer System 40 grams of the amino-modified fluid described in Example 5 was mixed with 6 grams of aluminum oxide C (Degussa) in the same example. 10 drops of glacial acetic acid were added to the mixture. This mixture is herein referred to as Part "A". The mixture, which was a viscous, flowable liquid, was stored in a wide-mouth plastic bottle.

40 grams of the epoxy fluid defined in Example 5 were mixed with six grams of aluminum oxide C. This mixture is herein referred to as Part "B". This mixture, which was a viscous, flowable liquid, was also stored in a wide-mouth plastic bottle.

11 grams of Part "A" were mixed with 4.1 grams of Part "B". At 70° F., the mixture cured in 96 hours to a hard, tack-free, elastomeric mass that adhered to the aluminum weighing dish in which it was mixed 11 Grams of Part "A" were mixed with 4.1 grams of Part "B", and placed in an oven at 100° C. for 30 minutes. Upon removal from the oven, it was found that the material had cross-linked to a tack-free elastomeric material that adhered strongly to the aluminum weighing dish in which the mixture had been prepared.

After 45 days of storage at 60° F. both Parts "A" and "B" were still pourable. On mixing 11 grams of Part "A" with 4.1 grams of Part "B", it was found that no change in the cure profile was observable as a result of storage.

What is claimed is:

1. A curable composition comprising:
   a. an amino-modified organopolysiloxane of the average general formula:

$Q_2RSiO-(SiR_2O)_x-(SiRR^1O)_y-SIRQ_2$  (I)

wherein Q is R or $R^1$; R is selected from the group consisting of monovalent hydrocarbon groups having 1 to 10 carbon atoms; $R^1$ is $R^2NHR^3$; each $R^2$ is the same or different and is a divalent $C_1$–$C_6$ alkylene group, optionally substituted with a hydroxyl group; $R^3$ is alkyl of $C_1$–$C_6$, an alkyl amine of $C_1$–$C_6$ or an alkanolarriine of $C_1$–$C_6$; x is zero or a positive number; y is a positive number and x + y are less than 1,100;

b. an epoxy-modified organopolysiloxane of the average general formula:

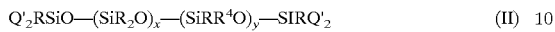
                                                                         (II)

wherein Q' is R or $R^4$; x, y and R are as previously defined; $R^4$ is $R^5$–$R^6$; $R^5$ is a divalent hydrocarbon group with at least two carbons, which may be may be interrupted by an oxygen atom; $R^6$ is an epoxide-containing group; and c. a curing catalyst comprising a catalytically effective amount of Lewis or Bronsted acid.

2. A composition as in claim 1 wherein the R groups are independently alkyl, aryl or aralkyl groups.

3. A composition as in claim 1 wherein Q is R and Q' is $R^4$.

4. A composition as in claim 1 wherein $R^2$ is ethylene or propylene, and $R^3$ is hydrogen, methyl, ethyl, propyl, aminoethyl, aminopropyl or propanolamino.

5. A composition as in claim 1 wherein the $R^5$ groups are selected from the group consisting of aliphatic groups, cycloaliphatic groups, aromatic groups, mixed aliphatic/aromatic groups, and (poly)ether groups and the $R^6$ groups are selected from the group consisting of glycidoxy, 3-methyl-4,5-cyclohexenyl oxide and 3,4-cyclohexenyl oxide.

6. A composition as in claim 1 wherein x is from 20 to 1000, y is from 1 to 50 and x/y ranges from 30:1 to 200:1 in formula (I), and from 5:1 to 30:1 in formula (II).

7. A composition as in claim 1 further comprising at least one of a filler, a pigment, a plasticizer, or mixtures thereof.

8. A composition as in claim 1 wherein said catalyst comprises a carboxylic acid.

9. A composition as in claim 8 wherein the carboxylic acid is acetic acid, chloroacetic acid, trichloroacetic acid, citric acid, or glycolic acid.

10. A composition as in claim 1 further comprising one or more organomodified alkoxy silanes.

11. A composition as in claim 10 wherein said organomodified alkoxy silanes are epoxy- and amino- modified silanes of the general formula:

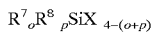

wherein $R^7$ is a monovalent hydrocarbon group having 1 to 10 carbon atoms, o is 0 or 1, $R^8$ is an amino- functionalized group as defined for $R^1$ or an epoxy-functionalized group as defined for $R^4$, p is an integer from 1 to 4, and X is a hydrolyzable or condensable group bonded directly to Si, or mixtures thereof.

12. A method of curing a composition as in claim 1 comprising providing a carboxylic acid to the composition.

13. A method as in claim 12 wherein the carboxylic acid is provided at a concentration of from about 0.0001% to about 5% based on a total composition weight.

14. A method as in claim 12 wherein the composition is cured at ambient room temperature or higher.

* * * * *